United States Patent

[11] 3,575,474

| [72] | Inventor | Paul E. Russ, Sr.<br>Englewood, Colo. |
|---|---|---|
| [21] | Appl. No. | 733,865 |
| [22] | Filed | June 3, 1968 |
| [45] | Patented | Apr. 20, 1971 |
| [73] | Assignee | The Gates Rubber Company<br>Denver, Colo. |

[54] POSITIVE DRIVE SYSTEM FOR AN ENDLESS TRACK
12 Claims, 9 Drawing Figs.

[52] U.S. Cl. ................................................. 305/35EB, 74/230.01
[51] Int. Cl. .................................................. B62d 55/12
[50] Field of Search ....................................... 305/35, 38, 57, 13; 74/229, 231, 243, 230.1, 230.6, 415

[56] References Cited
UNITED STATES PATENTS

| 618,652 | 1/1899 | Engel | 74/415X |
| 2,963,103 | 12/1960 | Wood | 74/415X |
| 2,815,988 | 12/1957 | Dowell | 305/37 |
| 2,770,977 | 11/1956 | Beckadolph | 74/229 |
| 2,899,242 | 8/1959 | Bombardier | 305/38 |
| 3,136,171 | 6/1964 | Nodwell | 305/57X |
| 3,148,921 | 9/1964 | Batur | 305/57X |
| 3,451,728 | 6/1969 | Bruneau | 305/35X |
| 3,472,563 | 10/1969 | Irgens | 305/35 |
| 2,461,150 | 2/1949 | Flynn | 305/35(EB) |
| 3,082,044 | 3/1963 | Klemm | 305/34X |

FOREIGN PATENTS

| 1,006,365 | 1/1952 | France | 305/38 |
| 12,244 | 11/1955 | Germany | 305/57 |

*Primary Examiner*—Richard J. Johnson
*Attorney*—Raymond Fink

ABSTRACT: A lug and sprocket, positive drive system for a flexible and endless track. An antifouling drive and idler wheel for a positive drive system for use in mud, snow or the like.

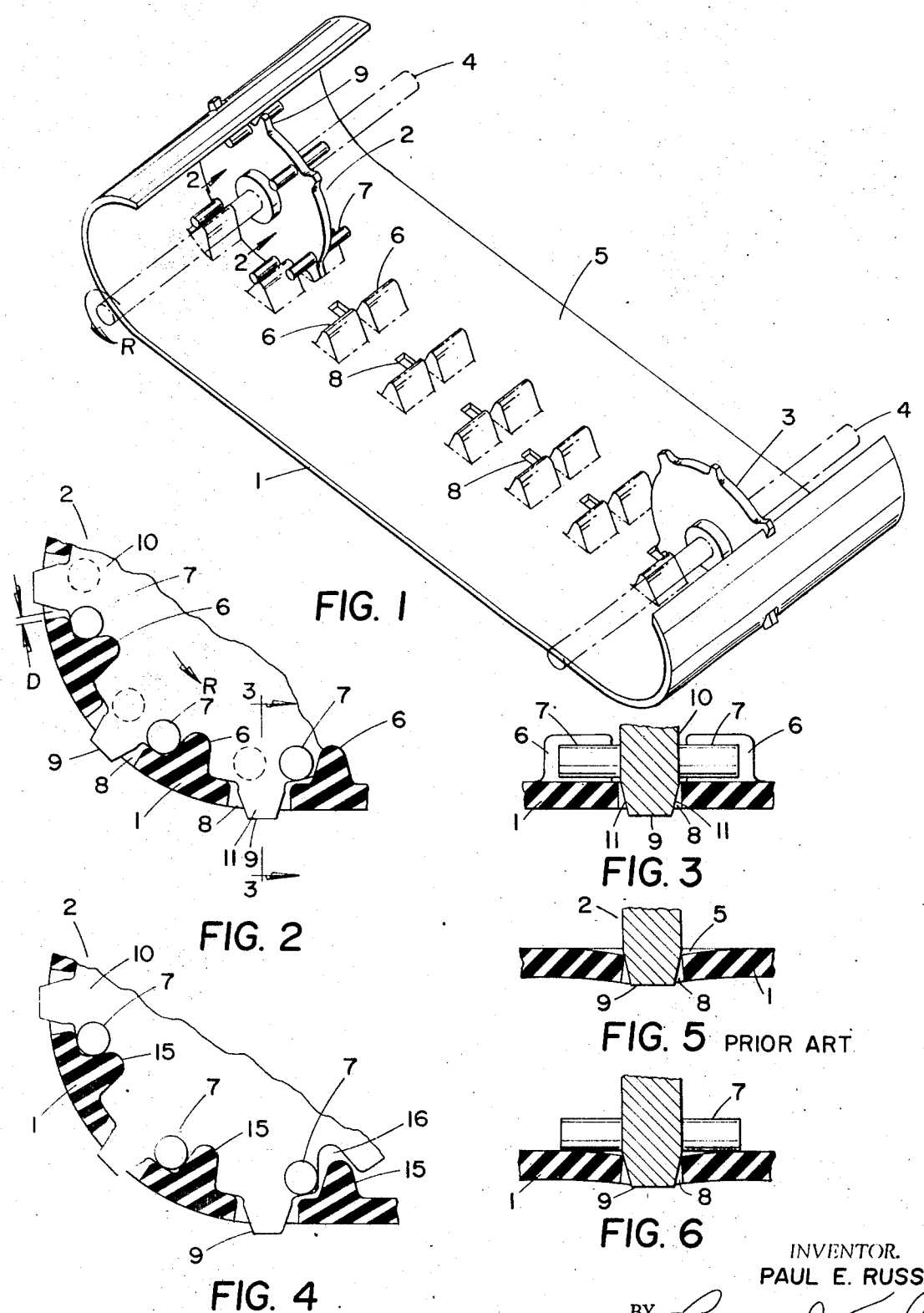

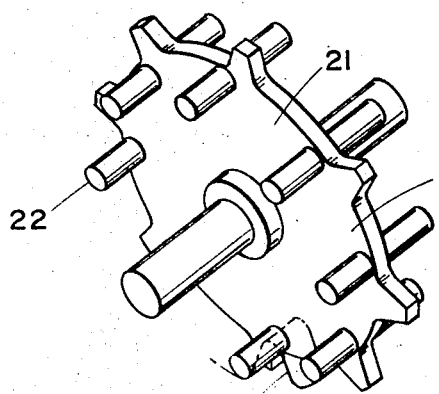
FIG. 7
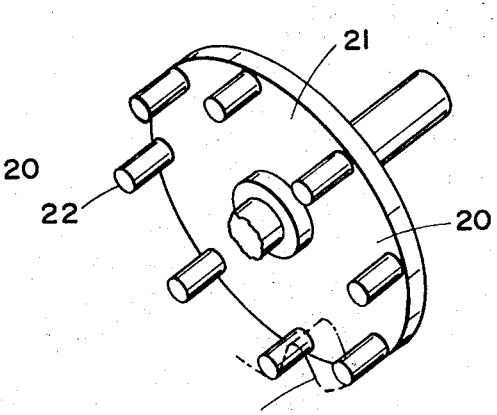
FIG. 8
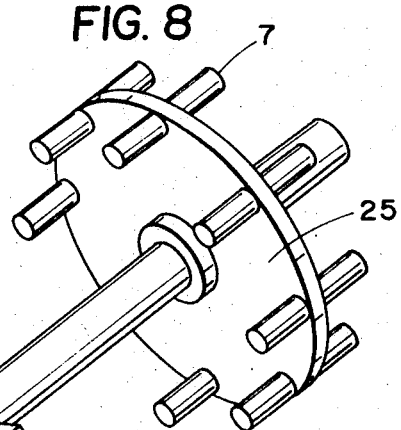
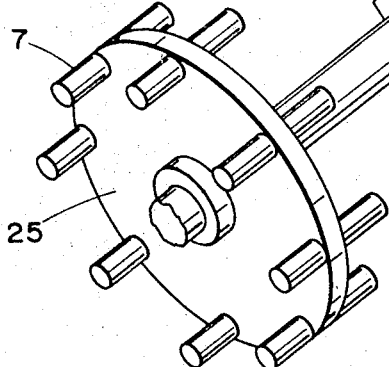
FIG. 9

POSITIVE DRIVE SYSTEM FOR AN ENDLESS TRACK

This invention relates to wheel substitutes for land vehicles, but more particularly, this invention relates to positive drive systems for flexible and endless track.

Flexible and endless tracks have been propelled by positive drive systems that employ sprocket wheels that mesh with sprocket teeth receiving openings in the body of said flexible and endless tracks. The sprocket drive has proven to be a satisfactory antifouling, positive drive system for flexible and endless track at moderate horsepower levels. However, as horsepower requirements for the positive drive system are increased, the probability of a track structural failure adjacent to the sprocket teeth receiving openings is also increased. A usual cause of track structural failure is related to a sprocket tooth that cannot distribute a structural load away from the sprocket teeth receiving openings and across the track.

An object of this invention is to provide a high horsepower sprocket drive system for a flexible and endless track.

Another object of this invention is to provide an antifouling drive wheel for a flexible and endless track.

Further objects of this invention will become apparent to those skilled in the art upon review of the appended drawings and description thereof.

This invention fulfills the aforementioned objectives through its novel design. The drive system comprises: a flexible and endless track that is substantially in the form of a flat strip and having a longitudinal row of equally spaced sprocket teeth receiving openings; at least one longitudinal row of equally spaced lugs projecting outwardly and away from the inner surface of the track; an idler wheel; and a specially shaped drive wheel system that interfaces with the lugs and the sprocket teeth receiving openings. Under normal conditions, power is distributed to the equally spaced lugs by the drive wheel while the sprocket teeth receiving openings in conjunction with the sprocket teeth, maintain alignment of the track on the drive wheel. The lugs distribute the structural load imposed by the drive wheel away from the sprocket teeth receiving openings. The drive wheel system has a shape which deters fouling of the positive drive system. Preferably, the surface of the drive wheel is of a polymeric material that is not susceptible to becoming coated with snow, ice, mud or the like. The operation of this invention is best understood in conjunction with the drawings.

FIG. 1 is a perspective view of the drive system showing a portion of the track cut away to expose the drive wheel, sprocket teeth receiving openings, lugs and idler wheel.

FIG. 2 is a sectional view of the drive system taken along the line 2-2.

FIG. 3 is an enlarged perpendicular view of FIG. 2 taken along the line 3-3.

FIG. 4 is a view similar to that of FIG. 2 showing a variation in the drive wheel and lug arrangement.

FIG. 5 is a view similar to that of FIG. 3 showing a sprocket drive wheel meshing with a lugless track.

FIG. 6 is a view similar to that of FIG. 3 showing the drive wheel meshing with a lugless track.

FIG. 7 is a perspective view of an antifouling drive wheel.

FIG. 8 is a perspective view of another antifouling drive wheel.

FIG. 9 is a perspective view of an antifouling drive wheel system.

A preferred embodiment of this invention is shown in FIGS. 1 and 2. The track of FIG. 1 is a cutaway view to expose the positive drive system. The rotatable drive wheel 2 and idler wheel 3 are respectively mounted to substantially parallel axle shafts 4 which are shown in dotted form. The drive wheel 2 and idler wheel 3 need not be of the same configuration. A plain wheel may be used as the idler wheel 3. The track 1 extends over and between the drive wheel 2 and idler wheel 3 such that both wheels interface with the inner surface 5 of the track 1. When the drive wheel 2 is rotated, the track 1 is positively driven in a rotating fashion around the drive wheel 2 and the idler wheel 3.

The mechanism of the positive drive system comprises two longitudinal rows of spaced apart lugs 6 that project outwardly and away from the inner surface 5 of the track 1 to mesh with tangs 7 protruding from the drive wheel 2; and one longitudinal row of spaced apart sprocket teeth receiving openings 8 to mesh with the sprocket teeth 9. The drive system as shown in FIGS. 1 and 2 is intended to be primarily rotated in the direction indicated by the arrow R although positive driving is also maintained in the opposite direction of rotation.

A preferred embodiment of this invention is equally spaced apart lugs and sprocket teeth receiving openings. However, randomly spaced apart lugs and sprocket teeth receiving openings to mesh with correspondingly spaced drive wheel sprocket teeth and tangs may be used.

Referring to FIGS. 2 and 3, the drive wheel 2 is predominently in the shape of a sprocket wheel having a plurality of tangs 7 projecting outwardly and away from the body 10 of the drive wheel 2 near the root circumference of the sprocket teeth 9, and said tangs 7 being at substantially 90° to the plane of rotation of the drive wheel 2. The pitch of the tangs 7 need not be the same as the pitch of the sprocket teeth 9 as indicated by the tangs shown in dotted line form. When the drive wheel is rotated in the direction as indicated by the arrow R, physical contact is made between the tangs 7 and the lugs 6 and thus torque is transmitted from the drive wheel 2 to the track 1 but away from the sprocket teeth receiving openings 8. The tangs 7 lead the sprocket teeth by the distance D. Under normal torque levels, the sprocket teeth 9 do not transmit rotational forces to the track 1. However, as the drive wheel torque increases to a level that causes the track 1 to be deflected the distance D, the sprocket tooth 9 will contact the edge of the sprocket teeth receiving openings 8 and thus the sprocket teeth 9 will coact with the tangs 7 to distribute rotational forces to the track 1.

The sides of the sprocket teeth 11 coact with the sprocket teeth receiving openings 8 to maintain alignment of the track 1 on the drive wheel 2. Should an angular deceleration or reversal of rotation of the drive wheel occur, a positive drive will be maintained by the sprocket teeth 9 and sprocket teeth receiving openings 8 even though the tangs 7 have no lugs upon which to react.

FIGS. 1, 2 and 3 depict a drive system employing two longitudinal rows of equally spaced lugs 6. FIG. 4 is exemplary of a drive system where only one longitudinal row of equally spaced lugs 15 is used. The operation of the drive system is primarily the same as previously explained except the body 10 has been modified to include lug receiving voids 16. The lug receiving voids 16 may transact rotational forces to the lugs for either direction of rotation of the drive wheel 2.

The tangs 7 provide the important secondary function of supporting the track 1 adjacent to the sprocket teeth receiving openings 8. Referring to FIGS. 5 and 6, a track 1 without lugs is shown. FIG. 5 shows in somewhat exaggerated form, the track being deformed as rotational forces of the drive wheel 2 are being transmitted from the sprocket tooth 9 to the track 1 through the sprocket tooth receiving openings 8. Repeated cycles of deforming the track 1 adjacent to the sprocket teeth receiving openings 8 typically causes track failure. As depicted by FIG. 6, the tangs 7 minimize the track 1 deformations by preventing the sprocket tooth 9 from "overentering"the sprocket tooth receiving opening 8 and by supporting the track 1 adjacent to the sprocket teeth receiving openings 8. Accordingly, a drive wheel 2, of the type depicted by FIGS. 1, 2, 3 and 6, is also an improved type drive wheel for a track employing a sprocket wheel type drive system having a lugless track.

Antifouling characteristics are desirable in any flexible and endless track drive system. Of particular importance is the shape of the drive wheel to preclude fouling tendencies of the drive system, especially when the drive system is subjected to mud, ice, snow or the like. The drive wheels as heretofore described and depicted have antifouling characteristics. The drive wheel may be of any suitable material such as a metal, a polymeric of a polymeric coated metal. A preferred embodiment of this invention comprises a drive wheel having a surface of high molecular weight polyethylene, polypropylene or polyurethane having tangs which are reinforced with a metal core. A polymeric outer surface is a preventative that deters ice or snow from sticking to the drive wheel. The antifouling characteristics of this invention are further exemplified by FIGS. 7 and 8. The body 20 is substantially in the form of a smooth and continuous disc. There is a complete and open area 21 surrounding each tang 22 which area 21 allows for the complete dissipation of a fouling material such as snow, ice, mud or the like when a lug 23, shown in dotted form, enters the area 21. The tangs preferably have a plastic exterior but may be of any suitable material.

FIG. 9 is exemplary of a drive wheel assembly which is within the scope of this invention. The tangs 7 have been mounted on separate wheels 25 apart from a sprocket wheel 26. The operation of the system is the same as described for FIGS. 1 and 2.

I claim:

1. A rotatable antifouling drive wheel in combination with: a first rotatable axle for mounting the antifouling drive wheel; a rotatable idler wheel mounted to a second axle which is substantially parallel to the first axle; and an endless and substantially flat track having at least one row of longitudinally aligned evenly spaced apart drive lugs projecting outwardly and away from the inner surface of the track, the track extending over and between the antifouling drive wheel and the idler wheel, wherein the improvement comprises: an imperforate disc-shaped body having sides shaped to define substantially planar smooth and continuous axially oppositely facing outer surfaces whereby the sides of said body are substantially free of projections capable of entrapping foreign material; a means for attaching the radially inner portion of said disc-shaped body to the first axle; and a plurality of spaced generally cylindrically shaped cantilevered tangs disposed substantially at and supported at a planar surface from the periphery of said disc-shaped body, said tangs projecting outwardly and away from at least one side of said disc-shaped body to interface and mesh with the lugs to drive the endless and substantially flat track.

2. An antifouling drive wheel according to claim 1 wherein said disc-shaped body has a surface of a material from the group consisting of polyethylene, polypropylene and polyurethane and natural and synthetic rubber.

3. A rotatable antifouling idler wheel in combination with: a rotatable drive wheel mounted to a first axle; a second rotatable axle for mounting the antifouling idler wheel which second axle is substantially parallel to the first axle; and an endless and substantially flat track having at least one row of longitudinally aligned evenly spaced apart drive lugs projecting outwardly and away from the inner surface of the track, the track extending over and between the antifouling idler wheel and the drive wheel, wherein the improvement comprises: an imperforate disc-shaped body having sides shaped to define substantially planar smooth and continuous axially oppositely facing outer surfaces whereby the sides of said body are substantially free of projections capable of entrapping foreign material; a means for attaching the radially inner portion of said disc-shaped body to the second axle; and a plurality of spaced generally cylindrically shaped cantilevered tangs disposed substantially at and supported at a planar surface solely from the periphery of said disc-shaped body, said tangs projecting outwardly and away from at least one side of said disc-shaped body to interface and mesh with the lugs.

4. An antifouling idler wheel according to claim 3 wherein said disc-shaped body has a surface of a material from the group consisting of polyethylene, polypropylene, polyurethane, and natural and synthetic rubber.

5. A positive drive system for an endless and substantially flat track, which comprises:

at least one rotatable wheel comprising a sprocket wheel having spaced apart sprocket teeth, and a plurality of correspondingly spaced apart tangs projecting outwardly and away from at least one side of said sprocket wheel near the root circumference of the sprocket teeth, and said tangs essentially parallel to the axis of rotation of said sprocket wheel;

at least one idler wheel;

a substantially flat and endless track extending over and between said rotatable wheel and said idler wheel, said flat and endless track having at least one longitudinal row of spaced apart sprocket teeth receiving openings that have a spacing such that the sprocket teeth of said sprocket wheel will mesh with the sprocket teeth receiving openings; and at least one longitudinal row of spaced apart lugs protruding outwardly and away from the inner surface of said flat and endless track, the said lug spacing being such that said lugs mesh with said tangs of said rotatable wheel.

6. A positive drive system according to claim 5 wherein said idler wheel is of the configuration of said rotatable wheel.

7. A positive drive system for an endless and substantially flat track, which comprises:

a sprocket wheel having spaced apart sprocket teeth;

a rotatable wheel comprising: a substantially disc-shaped body, a plurality of spaced apart tangs located around the circumference of said disc-shaped body, said tangs projecting outwardly and away from at least one side and disposed substantially at the periphery of said rotatable wheel such that the axis of said tangs are parallel to the axis of rotation of said rotatable wheel;

a common axle between said sprocket wheel and said rotatable wheel;

at least one idler wheel;

a substantially flat and endless track extending over and between said sprocket wheel, said rotatable wheel and said idler wheel, said flat and endless track having at least one longitudinal row of spaced apart sprocket teeth receiving openings having a spacing such that the sprocket teeth of said sprocket wheel will mesh with the sprocket teeth receiving openings; and at least one longitudinal row of spaced apart lugs protruding outwardly and away from the inner surface of said flat and endless track, said lugs having a spacing such that said lugs mesh with said tangs on said rotatable wheel.

8. A rotatable antifouling drive wheel in combination with an endless track having an inner surface and at least one row of longitudinally aligned evenly spaced apart sprocket teeth receiving openings, the track material surrounding the openings being resiliently deformable, which comprises: an imperforate sprocket wheel having sides shaped to define substantially planar smooth and continuous axially oppositely facing outer surfaces whereby the sides of said sprocket wheel are substantially free of projections capable of entrapping foreign material and having spaced apart sprocket teeth to interface and mesh with the sprocket teeth receiving openings of the endless and substantially flat track; and a plurality of spaced generally cylindrically shaped tangs disposed substantially at and supported solely from the periphery of the root circumference of the sprocket teeth, said tangs projecting outwardly and away from at least one side of said sprocket wheel to interface and support the inner surface of the endless and substantially flat track near the sprocket teeth receiving openings.

9. A rotatable antifouling drive wheel for use with an endless and substantially flat track having an inner surface, and at least one row of longitudinally aligned evenly spaced apart lugs projecting outwardly and away from the inner surface of the track, which comprises: an imperforate wheel having a central mounting means and sides shaped to define substantially planar smooth and continuous axially oppositely facing outer surfaces extending from the central mounting means to the wheel periphery, said disc-shaped body having a surface of a material from the group consisting of polyethylene, polypropylene and polyurethane and natural and synthetic rubber, whereby the sides of said wheel are substantially free of projections capable of entrapping foreign material; and a plurality of spaced generally cylindrically shaped cantilevered tangs disposed substantially at and supported solely from the periphery of said wheel, said tangs projecting outwardly and away from each side of said wheel, said tangs meshable with the lugs.

10. A drive wheel as set forth in claim 9 wherein the outer surfaces of said drive wheel are frustoconical 11. A drive wheel as set forth in claim 9 wherein said tangs have a cross section which is somewhat elliptical.

12. A rotatable antifouling drive wheel for use in combination with an endless and substantially flat track having an inner surface and at least one longitudinal row of sprocket teeth receiving openings, the track material surrounding the openings being resiliently deformable, which comprises: 1

A sprocket wheel having sides shaped to define a smooth and continuous outer surface whereby the sides of said sprocket wheel are substantially free of projections capable of entrapping foreign material, said sprocket wheel having a surface of a material from the group consisting of polyethylene, polypropylene, polyurethane and natural and synthetic rubber, and said sprocket wheel having spaced apart sprocket teeth to interface and mesh with the sprocket teeth receiving openings of the endless and substantially flat track; and a plurality of spaced apart tangs projecting outwardly and away from at least one side of said sprocket wheel near the root circumference of the sprocket teeth to interface and support the inner surface of the endless and substantially flat track near the sprocket teeth receiving openings.